US012466021B2

(12) United States Patent
Lee et al.

(10) Patent No.: US 12,466,021 B2
(45) Date of Patent: Nov. 11, 2025

(54) EXTERIOR MATERIAL FOR HOME APPLIANCE

(71) Applicant: SAMSUNG ELECTRONICS CO., LTD., Suwon-si (KR)

(72) Inventors: Minkyung Lee, Suwon-si (KR); Dosoo Sung, Suwon-si (KR); Kyunghwan Lee, Suwon-si (KR); Youngdeog Koh, Suwon-si (KR); Kwangjoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 273 days.

(21) Appl. No.: 18/142,961

(22) Filed: May 3, 2023

(65) Prior Publication Data
US 2024/0025002 A1 Jan. 25, 2024

Related U.S. Application Data

(63) Continuation of application No. PCT/KR2023/004982, filed on Apr. 13, 2023.

(30) Foreign Application Priority Data

Jul. 21, 2022 (KR) .................. 10-2022-0090595
Sep. 1, 2022 (KR) .................. 10-2022-0111042

(51) Int. Cl.
B32B 3/30 (2006.01)
A46B 9/00 (2006.01)
A46D 1/00 (2006.01)
B24B 7/19 (2006.01)
B32B 15/04 (2006.01)
B32B 15/08 (2006.01)
(Continued)

(52) U.S. Cl.
CPC .............. *B24B 7/19* (2013.01); *A46B 9/005* (2013.01); *A46D 1/0207* (2013.01); *D06F 39/12* (2013.01); *A46B 2200/3086* (2013.01); *A46B 2200/3093* (2013.01)

(58) Field of Classification Search
CPC ........... B32B 3/30; B32B 15/04; B32B 15/08; B32B 15/18; F25D 23/06; F25D 23/065; F23D 23/06; F23D 23/065
See application file for complete search history.

(56) References Cited

U.S. PATENT DOCUMENTS 5,101,603 A * 4/1992 Sevilla .................. B44C 1/22
451/41
6,203,403 B1 3/2001 Odstrcil et al.
(Continued)

FOREIGN PATENT DOCUMENTS

EP 3 127 654 A1 2/2017
EP 3 205 408 B1 9/2019
(Continued)

Primary Examiner — Joanna Pleszczynska
(74) Attorney, Agent, or Firm — STAAS & HALSEY LLP

(57) ABSTRACT

An exterior material may be configured to form an exterior of a home appliance, the exterior material includes a base material having a hierarchical circular structure pattern on the surface. The hierarchical circular structure pattern may include a plurality of circular structures having diameters different from each other, and a pattern density may be, in percentage of area of the surface, about 20 to 90%.

12 Claims, 10 Drawing Sheets

(51) Int. Cl.
    *B32B 15/18*     (2006.01)
    *D06F 39/12*     (2006.01)
    *F25D 23/06*     (2006.01)

(56) References Cited

U.S. PATENT DOCUMENTS

| | | | |
|---|---|---|---|
| 8,118,645 | B2 | 2/2012 | Wang |
| 8,834,990 | B2 | 9/2014 | Kim et al. |
| 8,974,269 | B2 | 3/2015 | Lee |
| 9,845,535 | B2 | 12/2017 | Kim et al. |
| 11,325,171 | B2 | 5/2022 | Sung et al. |
| 2010/0206464 | A1 | 8/2010 | Heo et al. |
| 2017/0057045 | A1 | 3/2017 | Sung et al. |
| 2018/0168351 | A1* | 6/2018 | Cho .................. A47B 96/20 |
| 2019/0217336 | A1 | 7/2019 | Bullard et al. |
| 2022/0081795 | A1* | 3/2022 | Kwon .................. C25D 5/605 |

FOREIGN PATENT DOCUMENTS

| | | |
|---|---|---|
| JP | 5041803 | 7/2012 |
| JP | WO 2015/151325 | 10/2015 |
| JP | 2021-133450 | 9/2021 |
| KR | 20-0240165 | 10/2001 |
| KR | 10-0860645 | 9/2008 |
| KR | 10-2010-0008582 | 1/2010 |
| KR | 10-1160847 | 6/2012 |
| KR | 10-2014-0142122 | 12/2014 |
| KR | 10-1568480 | 11/2015 |
| KR | 10-1823068 | 1/2018 |
| KR | 10-2018-0095352 | 8/2018 |
| KR | 10-2110979 | 5/2020 |
| KR | 10-2418445 | 7/2022 |

\* cited by examiner

EXTERIOR MATERIAL FOR HOME APPLIANCE

CROSS-REFERENCE TO RELATED APPLICATIONS

This application is a continuation of International Application No. PCT/KR2023/004982, filed Apr. 13, 2023, which claims priority to Korean Patent Application Nos. 10-2022-0090595, filed on Jul. 21, 2022 and 10-2022-0111042 filed on Sep. 1, 2022 in the Korean Intellectual Property Office, the disclosures each of which are incorporated herein by reference.

BACKGROUND

1. Field

Embodiments of the present disclosure relate to an exterior material for home appliances.

2. Description of the Related Art

Exterior materials for home appliances may be surface-treated to enhance the cubic sense and aesthetic sense.

Conventionally, as technology for surface treatment of exterior materials for home appliances, the straight-line polishing technique has been used, causing limitations in terms of design implementation.

More specifically, due to the characteristic of a base material having a long rectangular shape, the base material can be mounted on equipment only in one direction, which allows surface treatment only in one direction. Also, the surface treatment equipment can be mounted only in a roll direction of the base material, making the surface treatment possible only in one direction.

Therefore, due to the above-mentioned limitations in terms of material and equipment, according to the related art, hairlines implemented by surface treatment are formed with almost constant straight directions and depths, which results in a very monotonous pattern that reduces the aesthetic sense. Also, according to the related art, due to being difficult to control surface roughness, there is also a problem that the pattern is non-uniformly implemented.

SUMMARY

In accordance with one embodiment, an exterior material configured to form an exterior of a home appliance, the exterior material includes a base material having a surface with a hierarchical circular structure pattern on the surface. The hierarchical circular structure pattern may include a plurality of circular structures having diameters different from each other, and a pattern density may be, in percentage of area of the surface, about 20 to 90%.

The exterior material may further include a paint layer provided on the surface. The base material may include at least one of a coated steel sheet, stainless steel, or aluminum. The thickness of the base material may be 0.3 to 1.0 mm. The hierarchical circular structure pattern may have a diameter of 500 mm or less. The hierarchical circular structure pattern may result from utilizing at least one of a rotary wire, a polishing pad, or a brush. The rotary wire may include a stainless-steel wire brush. The stainless-steel wire brush may have a plurality of cylindrical rods arranged in a circular shape and a plurality of wires disposes in the rods. The brush may include at least one of a circular pad nylon brush, a diagonal nylon brush, or a nylon+sandpaper brush. The exterior material may have an average surface roughness (Ra) of about 0.05 to about 1.0 μm. The exterior material may have a glossiness of about 50 to about 300 GU.

In accordance with one embodiment, a home appliance includes: a home appliance body; and an exterior material provided on an outside of the home appliance body. The exterior material may include a base material having a surface with a hierarchical circular structure pattern on the surface. The hierarchical circular structure pattern may include a plurality of circular structures having diameters different from each other, and a pattern density may be, in percentage of area of the surface, of about 20 to 90%.

The exterior material may further include a paint layer provided on the surface. The base material may include at least one of a coated steel sheet, stainless steel, or aluminum. The thickness of the base material may be about 0.3 to 1.0 mm.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
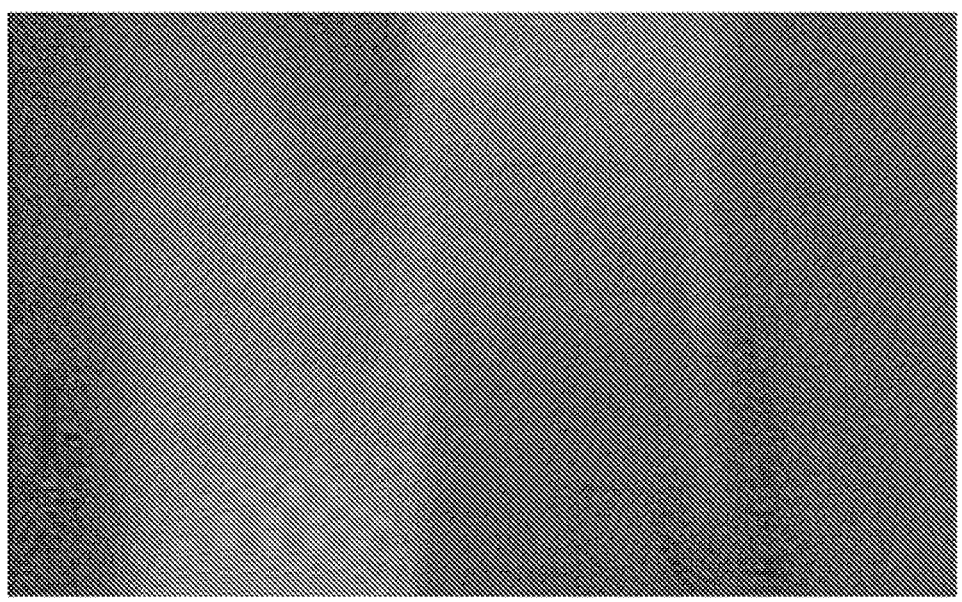
FIG. 1 is an image showing an exterior material for home appliances that is manufactured using the straight-line polishing technique.

Hereinafter, embodiments of the present disclosure will be described in detail with reference to the accompanying drawings. The following embodiments are presented to sufficiently convey the spirit of the present disclosure to those of ordinary skill in the art to which the present disclosure pertains. The present disclosure is not limited to the embodiments presented herein and may be embodied in other forms. In the drawings, illustration of parts unrelated to the description may be omitted to clarify the present disclosure, and sizes of components may be somewhat exaggerated to help understanding.

Throughout the specification, when a certain part is described as "including" a certain component, this signifies that the certain part may also include other components rather than excluding other components unless particularly described otherwise.

A singular expression includes a plural expression unless the context clearly indicates otherwise.

Therefore, it is an aspect of the present disclosure to provide an exterior material for home appliances that implements a hierarchical circular structure pattern including a plurality of circular structures on a surface to control the roughness and glossiness of the surface and enhance the cubic sense and aesthetic sense.

Additional aspects of the disclosure will be set forth in part in the description which follows and, in part, will be obvious from the description, or may be learned by practice of the disclosure.

According to one embodiment, by forming a hierarchical circular structure pattern including a plurality of circular structures, it is possible to provide an exterior material for home appliances that has a surface whose roughness and glossiness are controlled to enhance the cubic sense and aesthetic sense.

Also, according to one embodiment, patterns can be freely implemented without limitations in terms of material and equipment.

However, advantageous effects that can be achieved by the exterior material for home appliances according to embodiments are not limited to those mentioned above, and other unmentioned advantageous effects should be clearly understood by those of ordinary skill in the art to which the present disclosure pertains from the description below.

As a typical method of polishing an exterior material for home appliances, the straight-line polishing technique is applied, which implements a form having straight hairlines in vertical and horizontal directions.

FIG. 1 is an image showing an exterior material for home appliances that is manufactured using the straight-line polishing technique.

Referring to FIG. 1, in the case in which the straight-line polishing technique is applied, due to the limitations in terms of material and equipment, hairlines are very monotonously implemented in the same direction, which reduces an aesthetic sense.

According to one embodiment, an exterior material for home appliances includes a base material on which a hierarchical circular structure pattern is provided, and the hierarchical circular structure pattern may include a plurality of circular structures having diameters different from each other.

Figure 2:
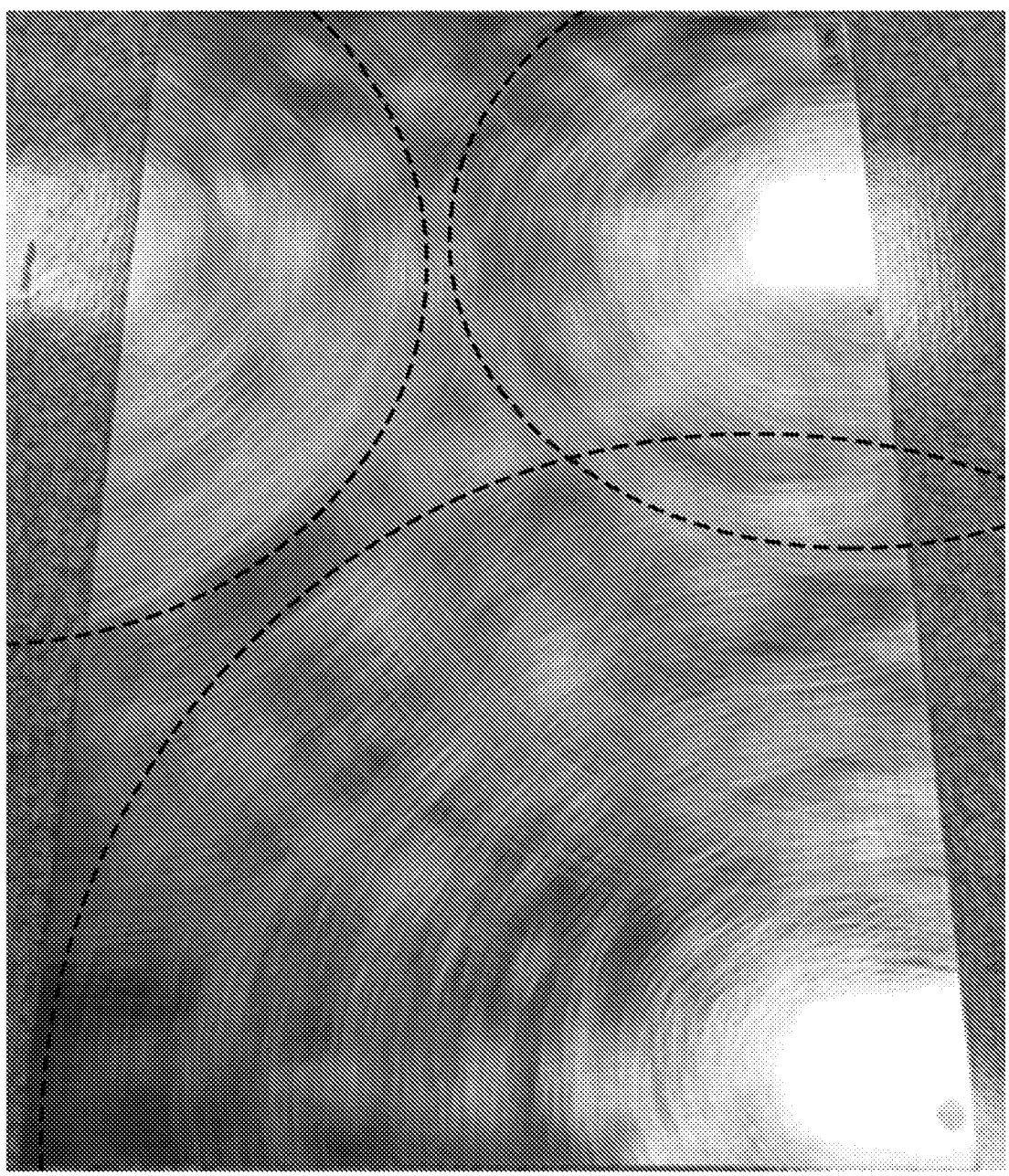
FIG. 2 is an image showing an exterior material for home appliances according to one embodiment.

FIG. 2 is an image showing the exterior material for home appliances according to one embodiment.

Referring to FIG. 2, in the exterior material for home appliances according to one embodiment, a hierarchical circular structure pattern may be provided on a base material. The hierarchical circular structure pattern indicates that circular structure patterns may be implemented to overlap each other.

The hierarchical circular structure pattern may include a plurality of circular structure patterns having diameters different from each other.

Referring to FIG. 2, three circular structure patterns may be implemented to overlap each other on a surface of an exterior material. The dotted lines shown in FIG. 2 indicate the maximum diameter of each circular structure pattern. The maximum diameter may be different for each circular structure pattern, and circular patterns having various diameters may be implemented to overlap each other in a single circular structure pattern. Although three circular structure patterns are illustrated in FIG. 2, the present disclosure is not limited thereto, and less than three or more than three circular structure patterns may be implemented according to the purpose and function.

The pattern density of the hierarchical circular structure pattern may be, in percentage of area, 20 to 90%. The percentage of area that indicates the pattern density refers to a percentage of area on which the hierarchical circular structure pattern is implemented relative to the entire area. According to the present disclosure, by controlling the pattern density, the surface roughness and glossiness can be freely controlled.

Meanwhile, the pattern density may be controlled using a rotational speed of a polishing body, a line speed, or the like.

Here, the line speed refers to a rotational speed of a roll around which a base material is wound.

The polishing body is a component configured to directly polish a surface of the base material, and the rotational speed of the polishing body may be increased to increase the pattern density. On the other hand, since a slow rotation of the roll around which the base material is wound causes the base material to be polished for a relatively long time by the polishing body, the line speed may be decreased to increase the pattern density.

A paint layer may be provided on the base material. Various colors may be implemented by the paint layer being provided on the base material. Also, by the paint layer being provided on the base material, surface slipperiness may be improved to facilitate cleaning of the surface.

The base material may include at least one of a coated steel sheet, stainless steel, and aluminum. However, the type of base material is not limited thereto, and various other types of base material may be selected and utilized according to the purpose and function.

The thickness of the base material may be 0.3 to 1.0 mm.

Durability may be low in the case in which the thickness of the base material is thin. However, in the case in which the thickness of the base material is thick, a large amount of raw material may be consumed, and thus price competitiveness may be lowered.

The hierarchical circular structure pattern may have a diameter of 500 mm or less. In the case in which the diameter exceeds 500 mm, the pattern may be recognized as a straight-line pattern instead of the circular structure pattern, and thus the cubic sense may be reduced.

The hierarchical circular structure pattern may be implemented by utilizing at least one of a rotary wire, a polishing pad, and a brush.

The rotary wire may include a stainless-steel wire brush.

The stainless-steel wire brush may have a plurality of cylindrical rods arranged in a circular shape and a plurality of wires disposed in the rods.

Figure 3:
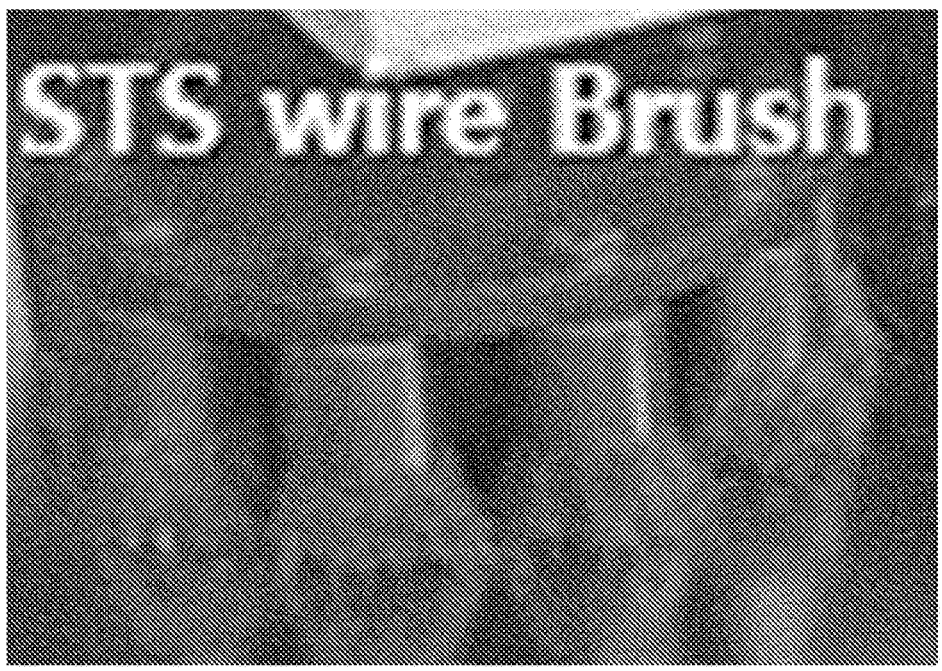
FIGS. 3 to 6 are images showing various polishing bodies.

FIG. 3 is an image showing the stainless-steel wire brush as one type of polishing body.

Referring to FIG. 3, the stainless-steel wire brush may have a form in which a plurality of cylindrical rods are arranged in a circular shape and the top of each cylindrical rod is fixed. A plurality of wires may be disposed in each of the cylindrical rods. As the stainless-steel wire brush rotates, the wires inside the cylindrical rods may polish the surface of the base material.

The brush may include at least one of a circular pad nylon brush, a diagonal nylon brush, and a nylon+sandpaper brush.

Figure 4:
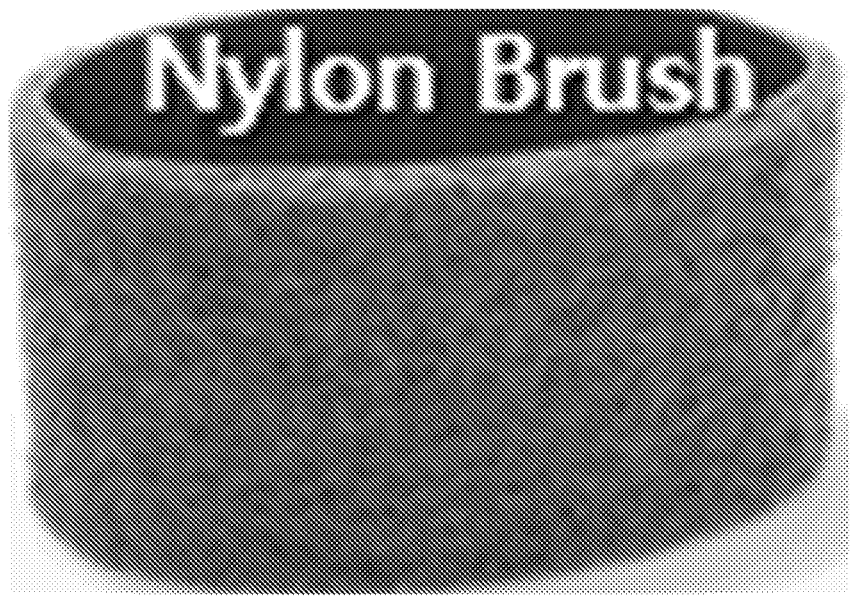
Figure 5:
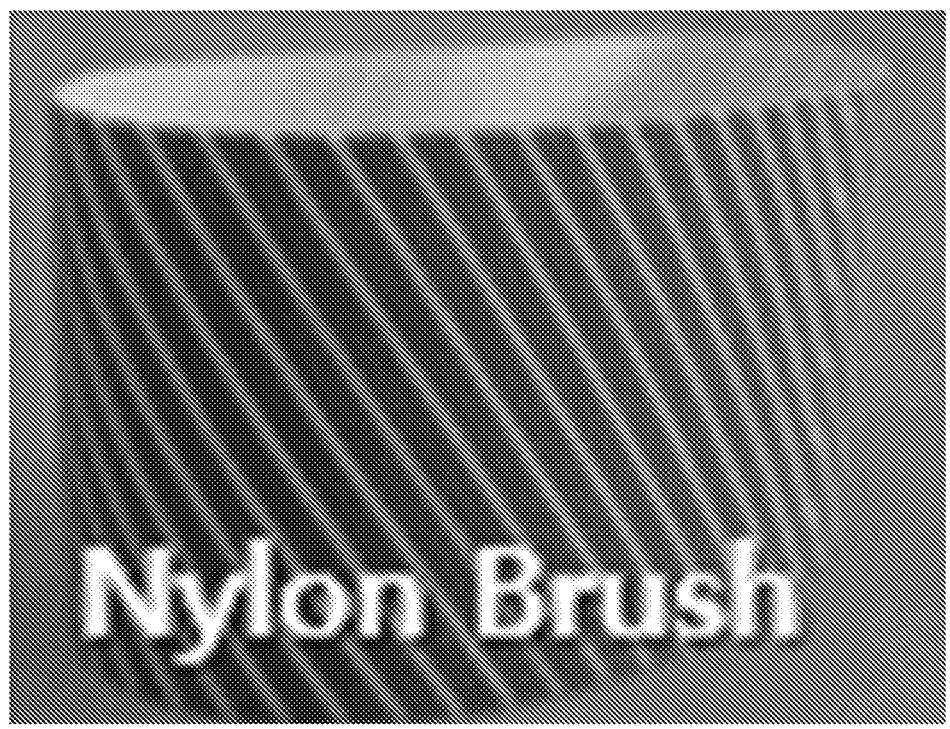
Figure 6:
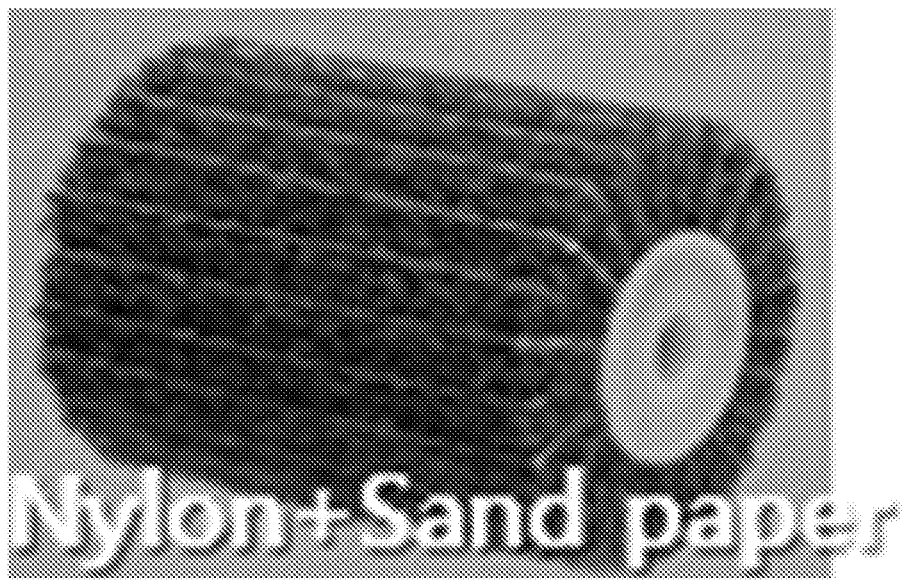

FIGS. 4 to 6 are images showing the circular pad nylon brush, the diagonal nylon brush, and the nylon+sandpaper brush as types of polishing body.

Referring to FIG. 4, the circular pad nylon brush may have a form in which a nylon pad is disposed in a circular shape. As the circular pad nylon brush rotates, the surface roughness of the base material may be controlled.

Referring to FIG. 5, the diagonal nylon brush may have a form in which a nylon pad having diagonal grooves formed therein is disposed in a circular shape. As the diagonal nylon brush rotates, circular patterns may be implemented in diagonal shapes on the base material. The diagonal shapes may be implemented to maintain predetermined gaps from each other.

Referring to FIG. 6, the nylon+sandpaper brush may have a form in which multiple nylon pads are fitted between sheets of sandpaper. As the nylon+sandpaper brush rotates, the surface roughness of the base material may be controlled.

By utilizing various polishing bodies described above, the surface morphology may be implemented in various ways to implement the exterior material for home appliances that has enhanced cubic sense and aesthetic sense.

By controlling the pattern density, the exterior material for home appliances according to one embodiment may have a value of roughness average (Ra) of 0.05 to 1.0 µm as the surface roughness.

In the case in which the value of Ra is less than 0.05 µm, the hierarchical circular structure pattern may become difficult to recognize by visual inspection, and thus the cubic sense may be reduced. However, when the value of Ra exceeds 1.0 µm, the uniformity of the paint layer provided on the exterior material may be decreased, and thus the surface quality may be degraded.

By controlling the pattern density, the exterior material for home appliances according to one embodiment may have a glossiness of 50 to 300 GU.

The glossiness may be glossiness measured at an angle of 60° to 85°.

In the case in which the glossiness is lower than 50 GU, a cubic effect recognized by visual inspection may be decreased. However, in the case in which the glossiness exceeds 300 GU, it may cause fatigue to the eye, and fingerprints may become too visible and decrease the marketability.

Next, a home appliance according to another aspect of the present disclosure will be described in detail.

A home appliance according to one embodiment includes: a home appliance body; and an exterior material provided on an outside of the home appliance body, wherein the exterior material may include a base material on which a hierarchical circular structure pattern is provided, the hierarchical circular structure pattern may include a plurality of circular structures having diameters different from each other, and a pattern density may be, in percentage of area, 20 to 90%.

The exterior material may further include a paint layer provided on the base material.

The base material may include at least one of a coated steel sheet, stainless steel, and aluminum and may have a thickness of 0.3 to 1.0 mm.

The hierarchical circular structure pattern may have a diameter of 500 mm or less.

Also, the hierarchical circular structure pattern may be implemented by utilizing at least one of a rotary wire, a polishing pad, and a brush.

The exterior material may have a value of Ra of 0.05 to 1.0 µm as the surface roughness and may have a glossiness of 50 to 300 GU.

The exterior material utilized in the home appliance is the same as the exterior material described above. Hereinafter, the home appliance according to one embodiment will be described in detail.

The home appliance according to one embodiment may include: the home appliance body; and the exterior material provided on the outside of the home appliance body.

Examples of the home appliance may include a refrigerator, a washing machine, a clothes management apparatus, and the like.

More specifically, the exterior material for home appliances according to one embodiment of the present disclosure may be utilized for a cabinet of a refrigerator, a cabinet of a washing machine, an outer body of a clothes management apparatus, or the like to enhance the cubic sense and aesthetic sense of the home appliance.

Examples of the home appliance body may include a cabinet of a refrigerator, a cabinet of a washing machine, an outer body of a clothes management apparatus, and the like.

The home appliance body may include a display configured to display an operational state of the home appliance. The display may be provided at an upper portion of the home appliance body to allow a user to visually directly recognize the display.

The home appliance body may include a controller configured to control the operation of the home appliance.

Hereinafter, examples and comparative examples will be described to help understanding of the present disclosure. However, the following description only corresponds to one example of the content and advantageous effects of the present disclosure, and the scope of rights of the present disclosure and advantageous effects thereof are not necessarily limited thereto.

EXAMPLES

Table 1 below shows the pattern density, value of Ra as surface roughness, and glossiness according to line speed.

The line speed refers to a rotational speed of a roll around which a base material is wound.

The pattern density was calculated by capturing an image of an exterior material for home appliances according to one embodiment using an optical microscope and then utilizing ImageJ software for an area occupied by a pattern relative to the entire area.

The value of Ra as surface roughness was measured by measuring an amount of vertical movement of a stylus, which moves perpendicular to a measurement surface of a sample, using a surface roughness measurement apparatus at room temperature (25° C.).

The glossiness was measured using a glossmeter (Model Name: BYK #4446) at a measurement angle of 60° to 85° at room temperature based on ASTM D523 and ASTM D2457.

TABLE 1

| Line speed (m/min) | 2.0 | 4.0 |
|---|---|---|
| Pattern Density (%) | 88.9 | 51.5 |
| Ra (µm) | 0.279 | 0.205 |
| Glossiness (GU) | 95 | 238 |

Referring to Table 1, it was found that the pattern density increased with a decrease in the line speed and decreased with an increase in the line speed. Also, the surface roughness tended to increase and the glossiness tended to decrease with an increase in the pattern density.

Figure 7:
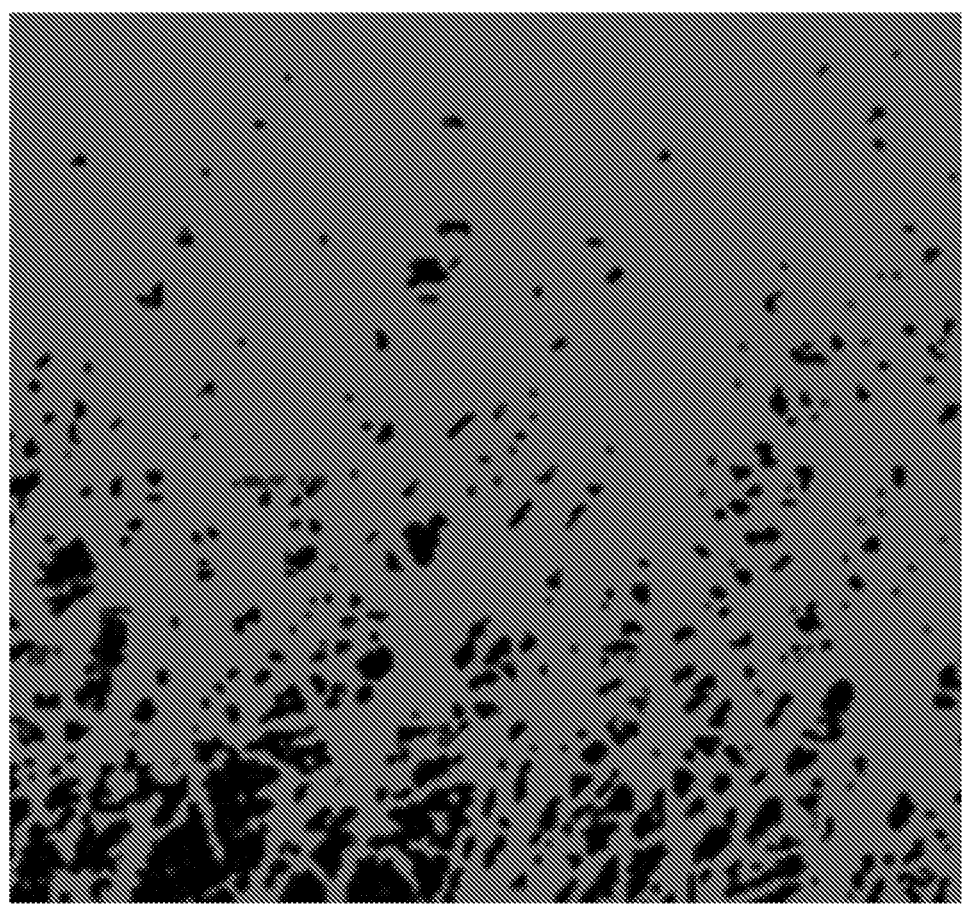
FIGS. 7 and 8 are images showing pattern densities.
Figure 8:
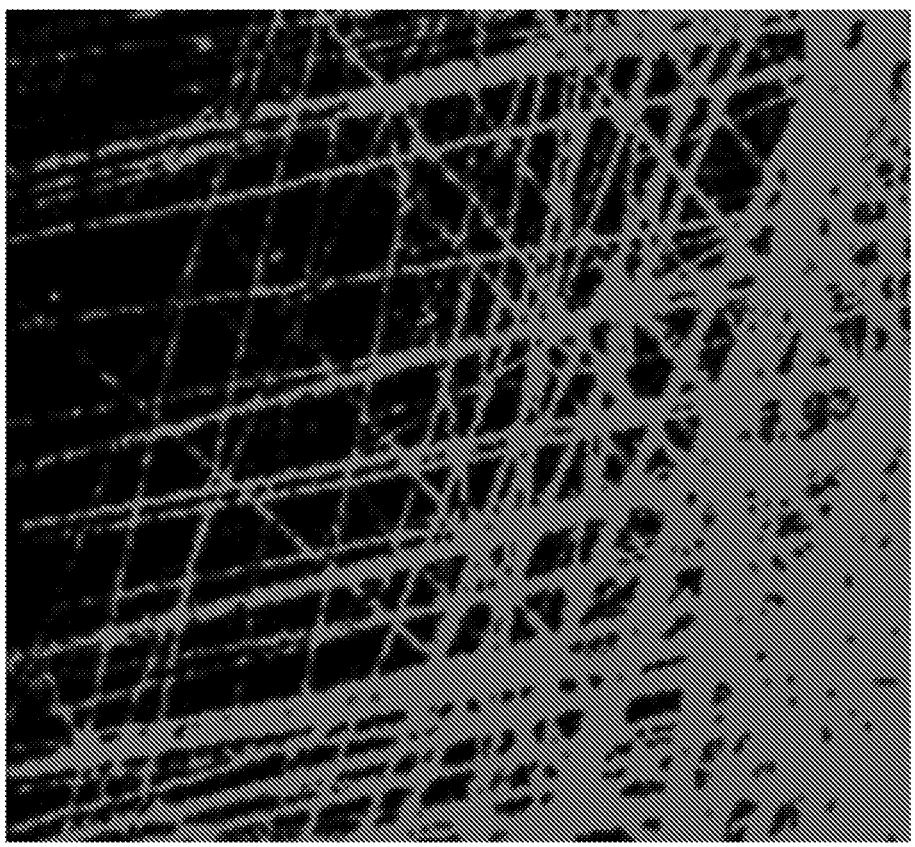

FIGS. 7 and 8 are images showing pattern densities of an exterior material implementing a hierarchical circular structure pattern. FIG. 7 shows a pattern density in the case of a low line speed, and FIG. 8 shows a pattern density in the case of a high line speed.

Referring to FIGS. 7 and 8, it can be seen that the line speed may be controlled to control an increase or decrease of the pattern density.

Figure 9:
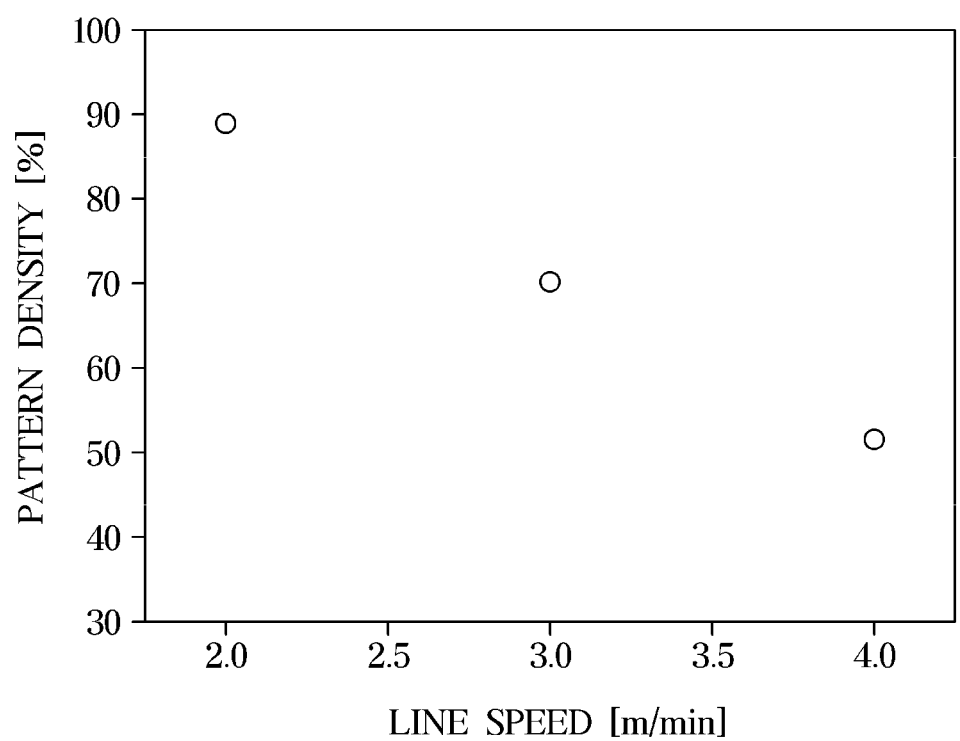
FIG. 9 is a graph showing changes in the pattern density according to the line speed.

FIG. 9 is a graph showing changes in the pattern density according to the line speed.

Referring to FIG. 9, it can be seen that the pattern density tends to linearly decrease with an increase in the line speed.

Figure 10:
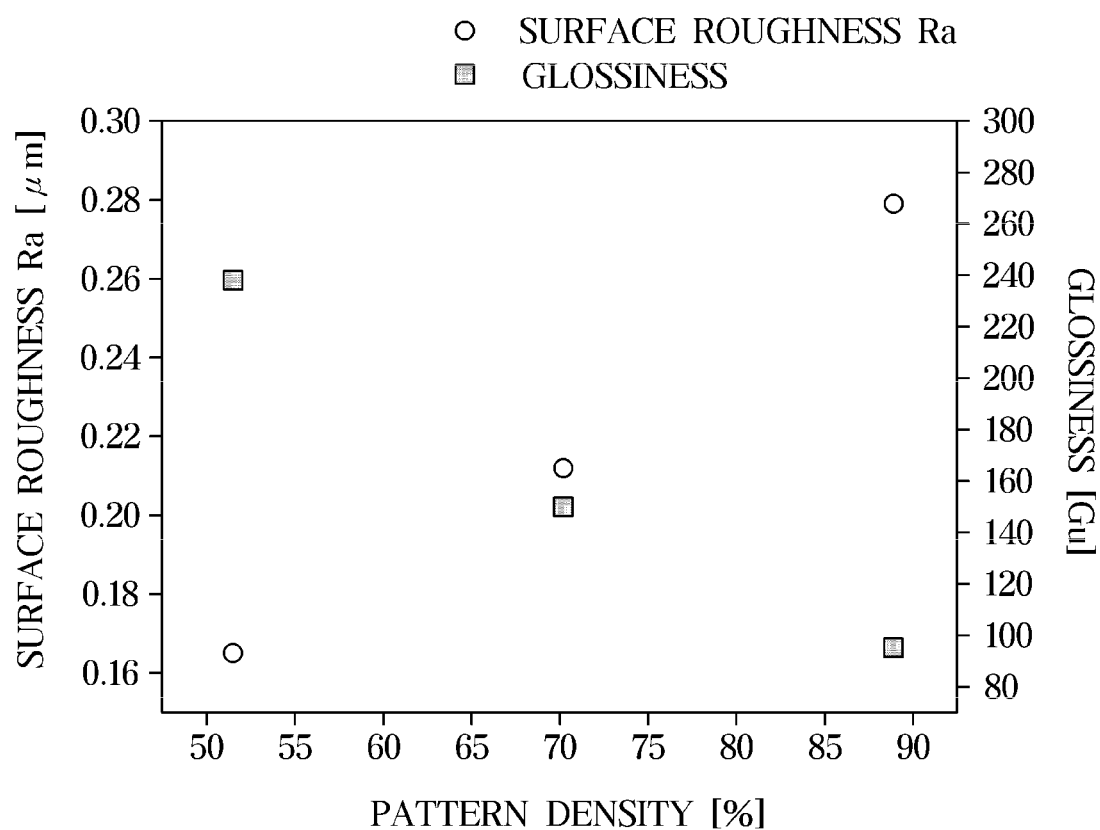
FIG. 10 is a graph showing changes in the surface roughness and glossiness according to the pattern density.

FIG. 10 is a graph showing changes in the surface roughness and glossiness according to the pattern density.

Referring to FIG. 10, the glossiness tends to decrease, while the value of Ra as surface roughness tends to increase, with an increase in the pattern density. That is, the value of Ra as surface roughness and the glossiness display the opposite trends.

As described above, the cubic sense may be reduced in the case of a small value of Ra as surface roughness, and uniformity of the paint layer may be decreased in the case of a large value of Ra as surface roughness. The cubic sense may be reduced in the case of low glossiness, and visibility of fingerprints may increase in the case of high glossiness.

Therefore, in the present disclosure, the pattern density is optimized to implement the surface roughness and glossiness at an appropriate level.

In this way, according to one embodiment of the present disclosure, it is possible to provide an exterior material for home appliances that allows surface roughness and glossiness to be freely controlled by controlling a pattern density and allows a target cubic sense and aesthetic sense to be secured.

Also, according to one embodiment of the present disclosure, it is possible to provide an exterior material for home appliances that has a hierarchical circular structure pattern formed to enhance the cubic sense and aesthetic sense without limitations in terms of material and equipment.

Specific embodiments illustrated in the drawings have been described above. However, the present disclosure is not limited to the embodiments described above, and those of ordinary skill in the art to which the disclosure pertains may make various changes thereto without departing from the gist of the technical spirit of the disclosure defined in the claims below.

What is claimed is:

1. An exterior material to form an exterior of a home appliance, the exterior material comprising:
   a base material having a surface with at least one hierarchical circular structure pattern on the surface, the at least one hierarchical circular structure pattern having a diameter of 500 mm or less, and including:
      a plurality of concentric circular structures, concentric circular structures of the plurality of concentric circular structures having different diameters, and
      a pattern density, in percentage of area of the surface, of about 20% to about 90%,
   wherein the exterior material has an average surface roughness (Ra) of 0.05 µm to 0.28 µm.

2. The exterior material of claim 1, further comprising a paint layer provided on the surface.

3. The exterior material of claim 1, wherein the base material includes at least one of a coated steel sheet, stainless steel, or aluminum.

4. The exterior material of claim 1, wherein a thickness of the base material is 0.3 to 1.0 mm.

5. The exterior material of claim 1, wherein the at least one hierarchical circular structure pattern results from utilizing at least one of a rotary wire, a polishing pad, or a brush.

6. The exterior material of claim 5, wherein the rotary wire includes a stainless-steel wire brush.

7. The exterior material of claim 6, wherein the stainless-steel wire brush has a plurality of cylindrical rods arranged in a circular shape and a plurality of wires disposed in rods of the plurality of cylindrical rods.

8. The exterior material of claim 5, wherein the brush includes at least one of a circular pad nylon brush, a diagonal nylon brush, or a nylon+sandpaper brush.

9. A home appliance comprising:
   a home appliance body; and
   an exterior material provided on an outside of the home appliance body, the exterior material includes a base material having a surface with at least one hierarchical circular structure pattern on the surface, the at least one hierarchical circular structure pattern having a diameter of 500 mm or less, and including:
      a plurality of concentric circular structures, concentric circular structures of the plurality of concentric circular structures having different diameters, and
      a pattern density is, in percentage of area of the surface, of about 20% to about 90%,
   wherein the exterior material has an average surface roughness (Ra) of 0.05 µm to 0.28 µm.

10. The home appliance of claim 9, wherein the exterior material further includes a paint layer provided on the surface.

11. The home appliance of claim 9, wherein the base material includes at least one of a coated steel sheet, stainless steel, or aluminum.

12. The home appliance of claim 9, wherein a thickness of the base material is about 0.3 to 1.0 mm.

* * * * *